(12) United States Patent
Goodman (10) Patent No.: US 10,197,369 B1
(45) Date of Patent: Feb. 5, 2019

(54) PRECISION CASE HOLDER (71) Applicant: Larry Goodman, Cerritos, CA (US)

(72) Inventor: Larry Goodman, Cerritos, CA (US)

(*) Notice: Subject to any disclaimer, the term of this patent is extended or adjusted under 35 U.S.C. 154(b) by 0 days.

(21) Appl. No.: 15/654,945

(22) Filed: Jul. 20, 2017

(51) Int. Cl.
*F42B 35/02* (2006.01)
*F42B 33/10* (2006.01)
*B23B 35/00* (2006.01)
B23B 5/16 (2006.01)

(52) U.S. Cl.
CPC ............. *F42B 35/02* (2013.01); *B23B 5/168* (2013.01); *B23B 35/00* (2013.01); *F42B 33/10* (2013.01)

(58) Field of Classification Search
CPC ......... B23B 5/168; B23B 35/00; F42B 35/02; F42B 33/10; F42B 33/004
See application file for complete search history.

(56) References Cited

U.S. PATENT DOCUMENTS

| 433,615 | A | 8/1890 | Brown |
|---|---|---|---|
| 2,402,650 | A | 6/1942 | Maffia |
| 2,302,869 | A | 11/1942 | Jewell |
| 2,398,491 | A | 4/1946 | Bell |
| 3,069,932 | A | 12/1962 | Sweeny et al. |
| 3,174,390 | A | 3/1965 | Jacobsen |
| 3,199,168 | A | 8/1965 | Rhine |
| 3,234,974 | A | 2/1966 | Ray |
| 3,274,661 | A | 9/1966 | Westbrook |
| 3,304,597 | A | 2/1967 | Kezran |
| 3,324,529 | A | 6/1967 | McCreery |
| 3,818,563 | A | 6/1974 | Beaulieu |
| 3,875,831 | A | 4/1975 | Beauloye |
| 3,999,452 | A | 12/1976 | Larsen |
| 4,135,846 | A | 1/1979 | Nowakowski |
| 4,486,131 | A | 12/1984 | Eckle |
| 4,742,606 | A | 5/1988 | Burby et al. |
| 4,813,827 | A | 3/1989 | Dugger |
| 5,054,970 | A | 10/1991 | Steiner |
| 5,076,122 | A | 12/1991 | Katzenburger et al. |
| 5,309,813 | A | 5/1994 | Henley |
| 5,497,539 | A * | 3/1996 | Blodgett ................. B23B 5/168 408/112 |
| 5,758,996 | A | 6/1998 | Loudon |
| 6,101,915 | A | 8/2000 | Sinclair |
| 6,484,616 | B1 | 11/2002 | Giraud |
| 6,957,936 | B2 | 10/2005 | Kress |

(Continued)

FOREIGN PATENT DOCUMENTS

| CH | 561576 | 5/1975 |
|---|---|---|
| DE | 2736819 | 2/1978 |
| SU | 1351706 | 11/1987 |

*Primary Examiner* — Teresa M Ekiert
(74) *Attorney, Agent, or Firm* — Averill & Green; Kenneth L. Green (57) ABSTRACT

A precision case holder engages the extraction groove of the rim of a straight wall case and established a fixed distance between a base of the case and a precision forward surface of the holder. The case may then be inserted into a case trimmer and the holder establishes a repeatable distance between the base of the case and a cutting tool in the case trimmer. The holder includes a tapered slot with edges which engage the extraction groove and a threaded piston which is tightened against the base of the case. The case slides into the tapered slot until the taper resists further sliding, and the piston is tightened to retain the case.

18 Claims, 6 Drawing Sheets

(56) References Cited

U.S. PATENT DOCUMENTS

| | | |
|---|---|---|
| 8,408,112 B2 | 4/2013 | Keska |
| 8,827,607 B1 | 9/2014 | Goodman |
| 1,153,673 A1 | 9/2015 | Bryant |

* cited by examiner

PRECISION CASE HOLDER

BACKGROUND OF THE INVENTION

The present invention relates to trimming and chamfering ammunition case mouths and in particular to a tool holding a straight wall case for trimming.

Ammunition cases are generally the most expensive component of ammunition. Many shooting enthusiasts reuse the cases to save money. While such cases may be capable of multiple uses, cases are somewhat stretched in each use. Reloading stretched cases causes variation in bullet seating and crimping, which affects accuracy.

To address the case stretching, the cases are often trimmed back to the original length. Unfortunately, there is no single precision case holder to accurately position the case with respect to a cutter to precisely trim various cases.

BRIEF SUMMARY OF THE INVENTION

The present invention addresses the above and other needs by providing a precision case holder which engages the extraction groove of the rim of a straight wall case and established a fixed distance between a base of the case and a precision forward surface of the holder. The case may then be inserted into a case trimmer and the holder establishes a repeatable distance between the base of the case and a cutting tool in the case trimmer. The holder includes a tapered slot with edges which engage the extraction groove and a threaded piston which is tightened against the base of the case. The case slides into the tapered slot until the taper resists further sliding, and the piston is tightened to retain the case.

In accordance with one aspect of the invention, there is provided a precision case holder which engages a variety of cases. The holder includes a tapered slot with edges which engage the extraction groove. The various size cases slide various distances into the tapered slot allowing one tool to hold many case sizes.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
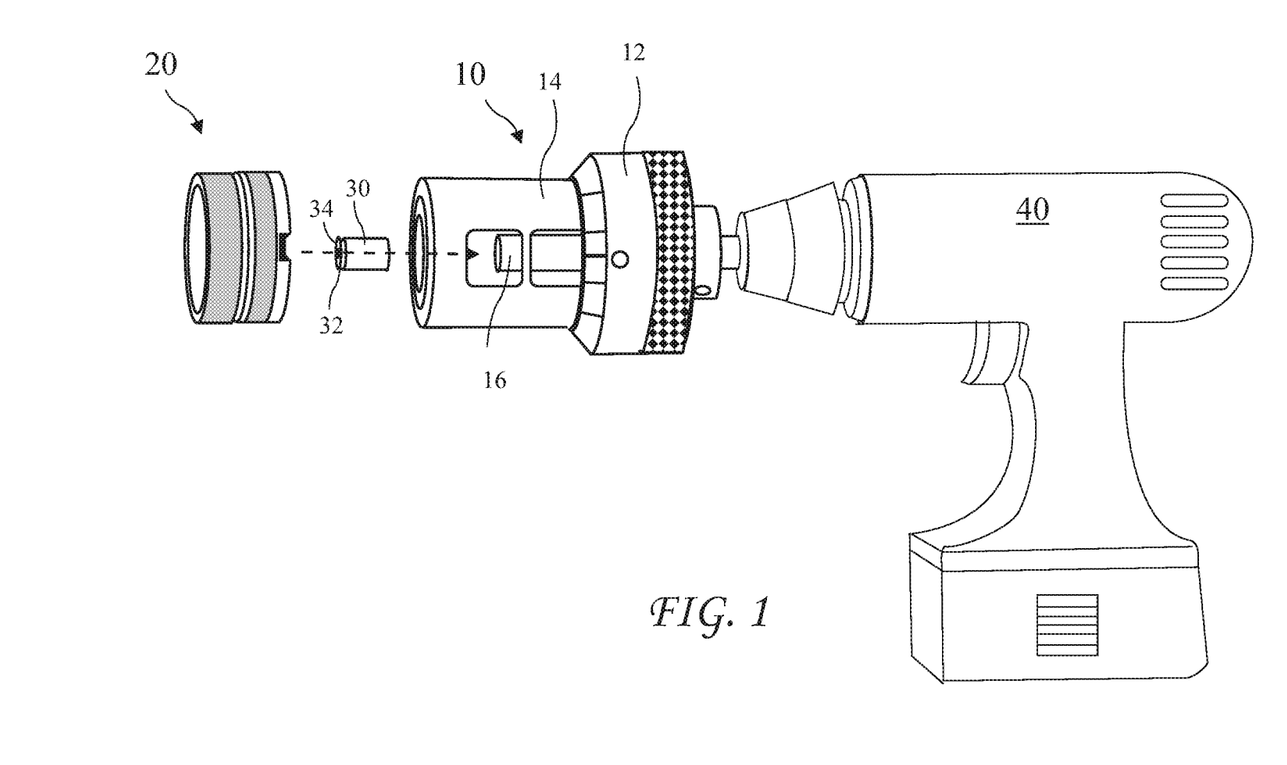
FIG. 1 is a side view of a known case trimmer and a precision case holder according to the present invention attached to a drill motor.

An exploded side view of a known case trimmer 10 attached to a drill motor 40, a straight wall case 30, and a precision case holder 20 according to the present invention is shown in FIG. 1. The case 30 may be attached to the holder 20 to insert the case 30 into a barrel 14 of the trimmer 10 for case trimming by a cutter 16, for example, an end mill, held by a micrometer dial 12. The straight wall case 30 includes an extraction groove 32 just forward of the case base 34. A suitable case trimmer is described in U.S. Pat. No. 9,022,704 issued May 5, 2015, and U.S. patent application Ser. No. 15/628,521, filed Jun. 20, 2017, both filed by the present applicant, which applications are incorporated by reference into the present application in their entirely.

Figure 2:
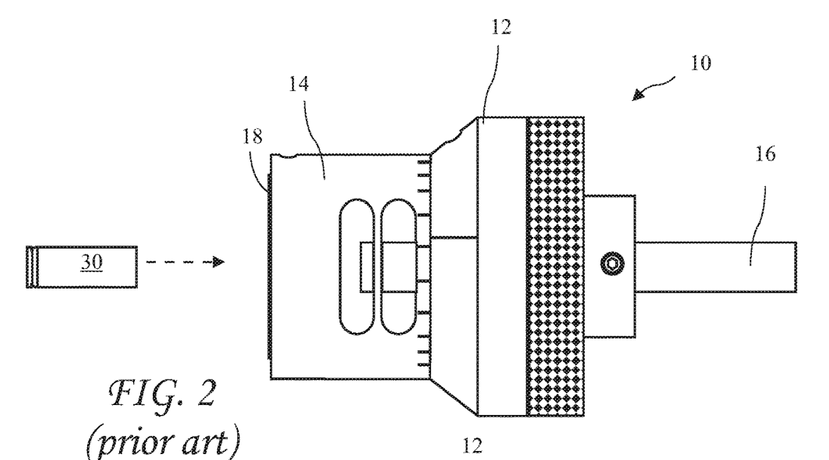
FIG. 2 is a side view of a case and the known case trimming assembly.

A side view of the case trimming assembly 10 attached to a drill motor 40 is shown in FIG. 2. The entire case trimming assembly 10, with only the exception of a rotating inner race of a case adapter bearing 18, is rotated by the drill motor 40. The user holds the case 30 and inserts the case 30 into the case adapter bearing 18 of the rotating case trimming assembly 10.

Figure 3:
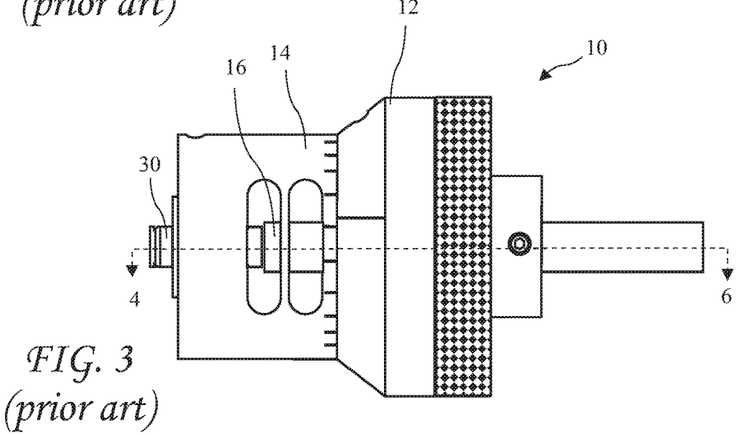
FIG. 3 is a side view of the known case trimming assembly with the case in the known case trimming assembly.
Figure 4:
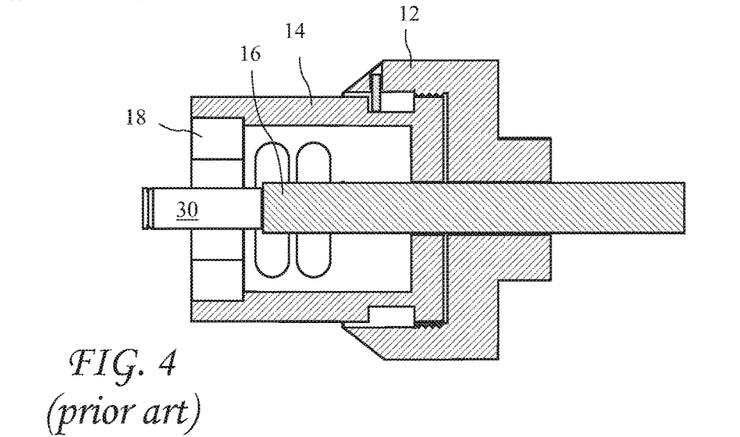
FIG. 4 is a cross-sectional view of the known case trimming assembly according to the present invention with the case in the case trimming assembly taken along line 4-4 of FIG. 3.

FIG. 3 shows the case inserted into the trimming assembly 10, and FIG. 4 shows a cross-sectional view of the case 30 inserted into the trimmer 10 taken along line 4-4 of FIG. 3. A bottle neck case seats against a contour in the case adapter bearing 18 to limit insertion of the case into the trimming assembly 10, but because the case 30 is a straight wall case, there is no simple way to precisely control the depth of the insertion of the case 30 into the case adapter bearing 18 of the trimming assembly 10 to precisely trim the case to a desire length.

Figure 5:
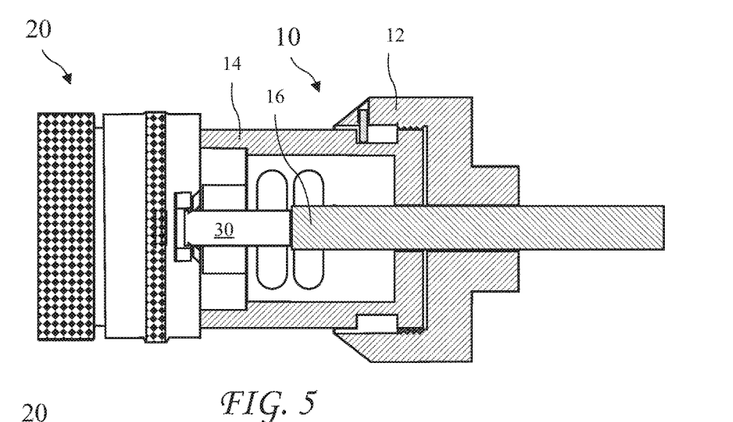
FIG. 5 shows a straight wall case held by the precision case holder according to the present invention to position the case in the case trimmer.

The straight wall case 30 held by the precision case holder 20 to position the case in the case trimmer 10 is shown in FIG. 5. The extraction groove 32 of the case 30 engages claws 29 on opposite sides of a tapered slot 28 in the face of the face piece 26 (see FIGS. 6 and 7B) and the center piece 24 (see FIGS. 6, 11A, and 11B).

Figure 6:
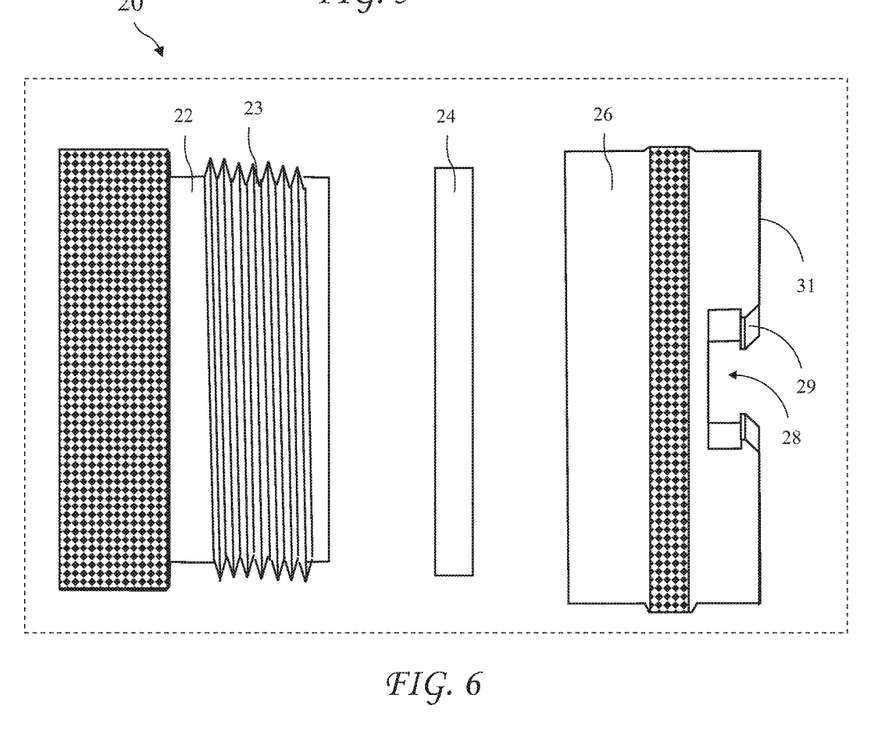
FIG. 6 shows the components of the precision case holder according to the present invention.

Three components of the precision case holder 20 are shown in an exploded view in FIG. 6. A passage 36 is open on opposite side of the face piece 26 allowing the base 38 of the case 30 to slide into the face piece 26 behind the jaws 29.

Figure 7A:
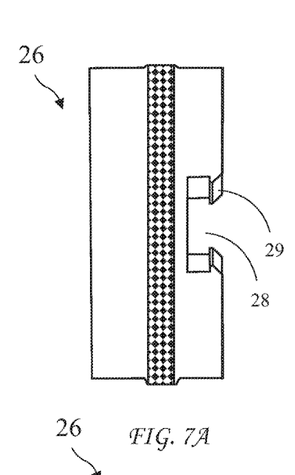
FIG. 7A shows a side view of a face piece of the precision case holder according to the present invention.
Figure 7B:
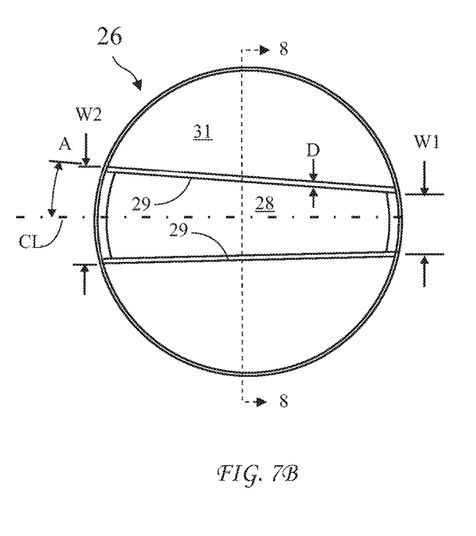
FIG. 7B shows a front view of the face piece of the precision case holder according to the present invention.
Figure 7C:
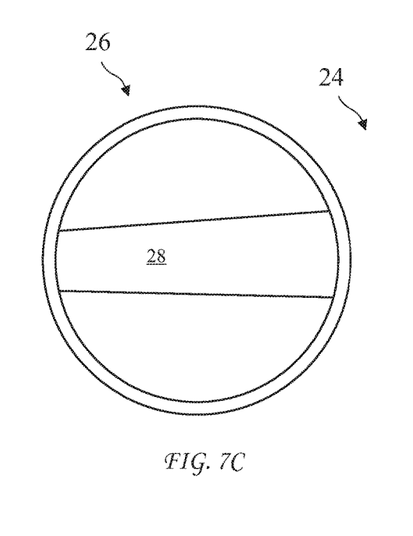
FIG. 7C shows a rear view of the face piece of the precision case holder according to the present invention.
Figure 8:
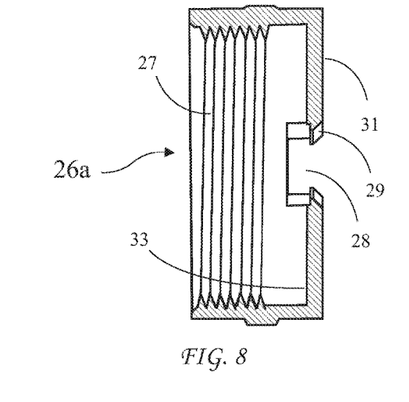
FIG. 8 shows a cross-sectional view of the face piece of the precision case holder according to the present invention to position the case in the case trimmer taken along line 8-8 of FIG. 7B.

A side view of a face piece 26 of the precision case holder 20 is shown in FIG. 7A, a front view of the face piece 26 is shown in FIG. 7B, a rear view of the face piece is shown in FIG. 7C, and a cross-sectional view of the face piece 26 taken along line 8-8 of FIG. 7B, 20 is shown in FIG. 8. The face piece 26 includes a flat face 31 having the tapered slot 28 having the claws 29 to engage the extraction groove 32 of the straight wall case 30. The tapered slot 28 tapers at a half angle A, and a first smaller width W1, and has a second larger width W2. The angle A is preferably about 3 degrees, the width W1 is preferably about 0.3 inches, and the width W2 is preferably about 0.534 inches. The claws 29 preferably have a depth D of about 0.05 inches.

The face piece 26 further includes rear facing wall 33 facing the forward surface 25 of the tail piece 22, the center piece 24 sandwiched between the rear facing wall 29 and the forward surface 25. The face piece 26 further includes female threads 27 in a recess 26a to engage male threads 23 (see FIG. 6) of the tail piece 22 to assemble the precision case holder 20 and to grasp the straight wall case 30.

Figure 9A:
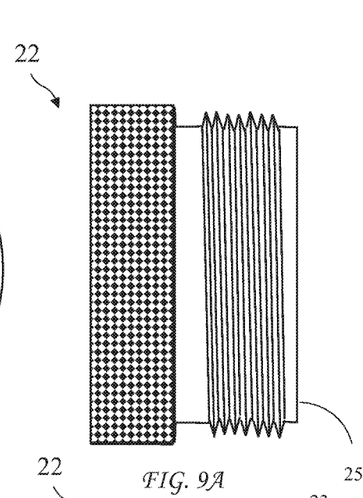
FIG. 9A shows a side view of a tail piece of the precision case holder according to the present invention.
Figure 9B:
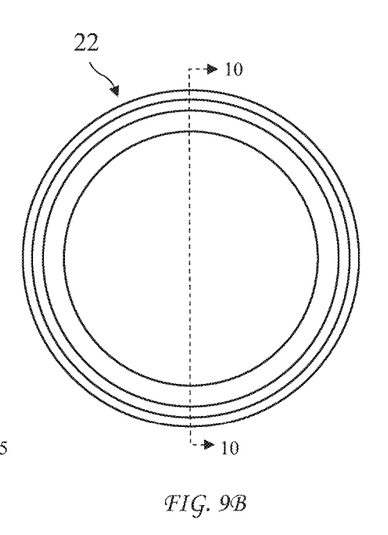
FIG. 9B shows a front view of the tail piece of the precision case holder according to the present invention.
Figure 9C:
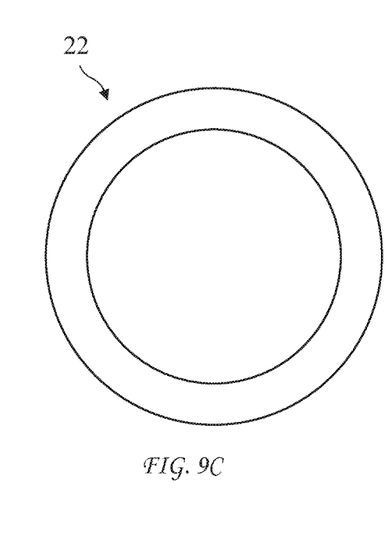
FIG. 9C shows a rear view of the tail piece of the precision case holder according to the present invention.
Figure 10:
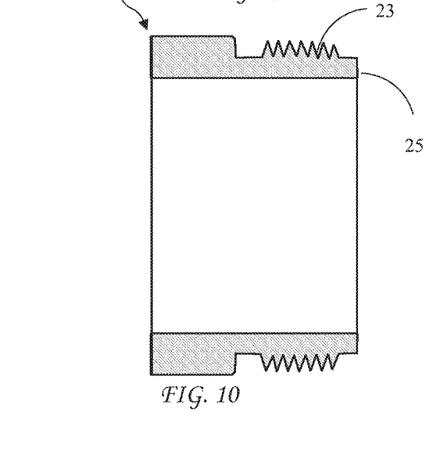
FIG. 10 shows a cross-sectional view of the tail piece of the precision case holder according to the present invention to position the case in the case trimmer taken along line 10-10 of FIG. 9B

A side view of a tail piece 22 of the precision case holder 20 is shown in FIG. 9A, a front view of the tail piece 22 is shown in FIG. 9B, a rear view of the tail piece 22 is shown in FIG. 9C, and a cross-sectional view of the tail piece 26 taken along line 10-10 of FIG. 9B, is shown in FIG. 10. The tail piece 22 includes the male threads 23 which engage the female threads 27 of the face piece 26 (see FIG. 6) of the tail piece 22 to assemble the precision case holder 20 and to grasp the straight wall case 30. The tail piece 22 further includes a forward surface 25 which bears against the center piece 24 to grasp the straight wall case 30. The center piece 24 preferably has a thickness T of about ⅛ inches.

Figure 11A:
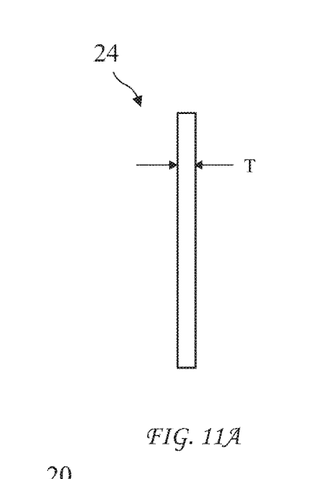
FIG. 11A shows a side view of a center of the precision case holder according to the present invention.
Figure 11B:
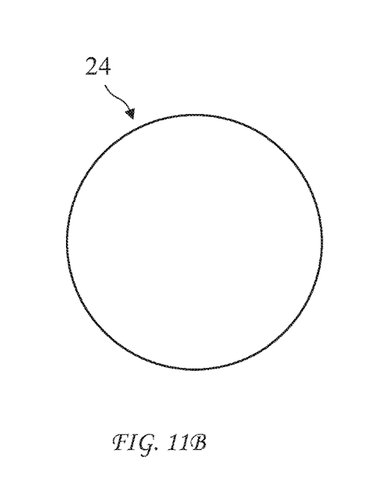
FIG. 11B shows a front view of the center piece of the precision case holder according to the present invention.

A side view of the center piece 24 of the precision case holder 10 is shown in FIG. 11A and a front view of the center piece 24 is shown in FIG. 11B. The center piece 24 is preferably a simple flat disk.

Figure 12:
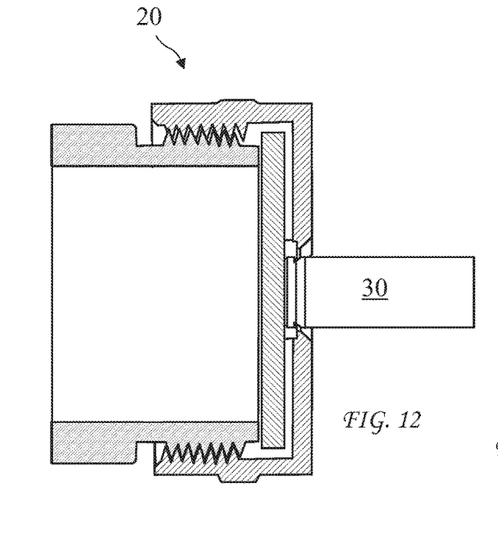
FIG. 12 shows a cross-sectional view of the precision case holder according to the present invention holding the straight wall case.
Figure 13:
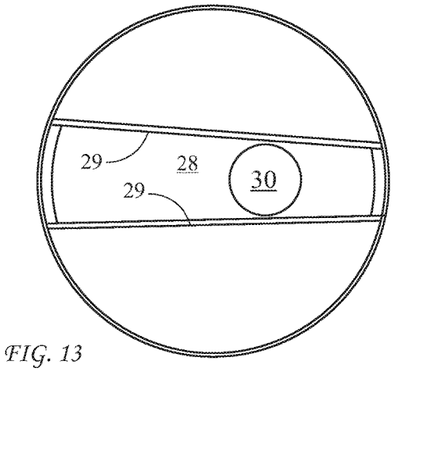
FIG. 13 shows a front view of the precision case holder according to the present invention holding the straight wall case.

A cross-sectional view of the precision case holder 20 holding the straight wall case 30 is shown in FIG. 12 and a front view of the precision case holder 20 holding the straight wall case 30 is shown in FIG. 13. The case 30 slides along arrow A into the tapered groove 28 from a wide end 28a towards a narrow end 28b until the claws prevent any further engagement, and then the tail piece 22 is tightened to press the center piece 24 against the base 34 of the straight wall case 30.

A side view of the precision case holder 20 is shown in FIG. 14. The center piece 24 is shown entering the tapered slot 28 pushed forward by the tail piece 22.

While the invention herein disclosed has been described by means of specific embodiments and applications thereof, numerous modifications and variations could be made thereto by those skilled in the art without departing from the scope of the invention set forth in the claims.

I claim:
1. A method for trimming a straight wall case, comprising:
sliding a base of the straight wall case into a tapered slot of a case holder, the case holder comprising:
  a face piece including:
    a face having the tapered slot including a wide end, and a narrow end opposite to the wide end, the tapered slot narrowing from the wide end to the narrow end and ending at the narrow end; and
    claws reaching in on each side of the tapered slot; and
  a tail piece configured to advance towards the face piece to capture the base of the straight wall case in the tapered slot between the tail piece and the face piece;
holding the straight wall case by the case holder;
inserting a mouth of the straight wall case into a case trimmer; and
trimming the straight wall case,
wherein the tail piece of the case holder threadedly engages the face piece to advance the tail piece towards the face piece.

2. The method of claim 1, wherein the tapered slot of the case holder tapers at about a three degree half angle.

3. The method of claim 1, wherein the tapered slot of the case holder tapers down from 0.534 inches to 0.3 inches.

4. The method of claim 1, wherein the claws of the case holder reach 0.05 inches into opposite sides of the tapered slot.

5. The method of claim 1, wherein the case holder further includes a center piece residing between a forward surface of the tail piece and a rearward facing interior wall of the face piece.

6. The method of claim 5, wherein the center piece is a flat disk.

7. The method of claim 1, wherein the face piece of the case holder includes a flat face is configured to bear against the case trimmer to repeatably position the straight wall case in the case trimmer.

8. The method of claim 1, wherein the case trimmer includes a bearing on a face presented to the straight wall case, and the method further including inserting the straight wall case through the face and into the case trimmer until the case holder resided against the bearing for trimming the straight wall case to the correct length.

9. The method of claim 8, wherein the bearing includes an inner race aligning the straight wall case with a cutter in the case trimmer for trimming the straight wall case.

10. The method of claim 1, wherein:
the tapered slot tapering from a first width 0.534 inches of a first end and a second width of 0.3 inches at a second end opposite to the first end, at a half angle of three degrees, the tapered slot open at the first end;
the claws reach in on each side of the tapered slot reaching in 0.05 inches;
the tail piece threadably engaging the face piece; and
a center piece resides between a forward surface of the tail piece and a rearward facing interior wall of the face piece.

11. The method of claim 1, wherein:
the tail piece threadably engaging the face piece; and
a center piece resides between a forward surface of the tail piece and a rearward facing interior wall of the face piece; the straight wall case
and wherein sliding the base of the one of the straight wall cases into the tapered slot comprises sliding an extraction groove of the straight wall case into the tapered slot, the claws of the tapered slot engaging the extraction groove of the straight wall case; and the method further includes advancing the tail piece against the center piece to press the center piece against the base of the straight wall case to grasp the base of the straight wall case between the center piece and the claws.

12. The method of claim 1, wherein sliding the base of the straight wall case into the tapered slot comprises sliding the base of the straight wall case into the tapered slot until the narrowing of the tapered slot prevents further sliding into the tapered slot; and the method further includes tightening the tail piece into the face piece to grasp the straight wall case.

13. The method of claim 1, wherein the position of the straight wall case in the tapered slot after sliding the straight wall case into the tapered slot until the straight wall case can slide no farther due to a taper of the tapered slot varies based on the diameter of the straight wall case.

14. The method of claim 1, wherein the tapered slot has generally straight edges.

15. The method of claim 1, wherein both the wide end and the narrow end of the tapered slot are open.

16. The method of claim 1, wherein the tapered slot is fixed in the face piece, the claws not opening or closing to grasp the straight wall case.

17. A method for trimming a straight wall case, comprising:

sliding a base of the straight wall case into a tapered slot of a case holder, the case holder comprising:
- a face piece including:
  - a face having the tapered slot including generally straight edges and having a wide end, and a narrow end opposite to the wide end, the tapered slot narrowing from the wide end to the narrow end and ending at the narrow end, and
  - fixed claws reaching in on each edge of the tapered slot;
- a tail piece configured to advance towards the face piece to capture a base of the straight wall case in the tapered slot between the tail piece and the face piece; and
- a flat disk shaped center piece between the tail piece and the face piece;

continuing sliding the base of the straight wall case into the tapered slot until further sliding is prevented by the narrowing of the tapered slot;

tightening the tail piece against the center piece to grasp the base of the straight wall case between the center piece and the claws of the face piece;

holding the straight wall case by the case holder;

inserting a mouth of the straight wall case into a case trimmer; and trimming the straight wall case.

18. A method for trimming a straight wall case, comprising:

sliding a base of the straight wall case into a tapered slot of a case holder, the case holder comprising:
- a face piece including:
  - a flat face having the tapered slot including generally straight edges and having a wide end, and a narrow end opposite to the wide end, the tapered slot narrowing from the wide end to the narrow end and ending at the narrow end,
  - fixed claws reaching in on each edge of the tapered slot, and
  - a recess opposite to the face, the recess containing female threads,
- a tail piece having male threads engagable with the female threads of the face piece and configured advance into the recess of the face piece; and
- a flat disk shaped center piece residing in the recess of the face piece between the tail piece and the face piece;

continuing sliding the base of the straight wall case into the tapered slot until further sliding is prevented by the narrowing of the tapered slot;

tightening the tail piece into the recess in the face piece and against the center piece to press the center piece against the base of the straight wall case to grasp the base of the straight wall case between the center piece and the claws of the face piece;

holding the straight wall case by the case holder;

inserting a mouth of the straight wall case into a case trimmer; and trimming the straight wall case.

* * * * *